J. R. SCHRADER.
LOCK NUT.
APPLICATION FILED APR. 17, 1919.
1,347,124.
Patented July 20, 1920.
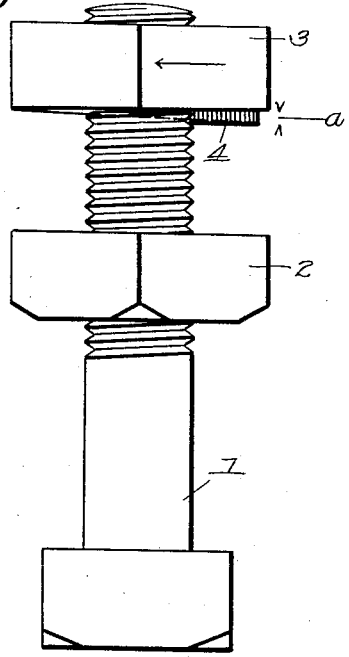
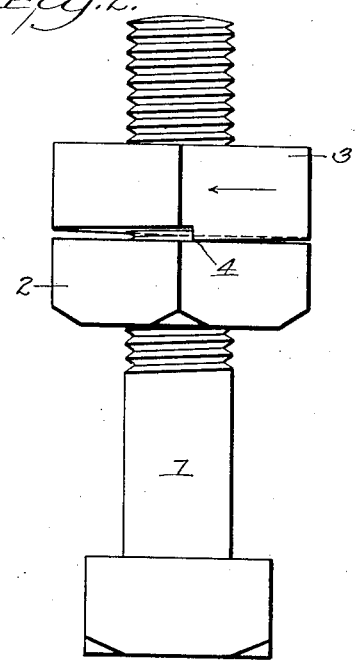
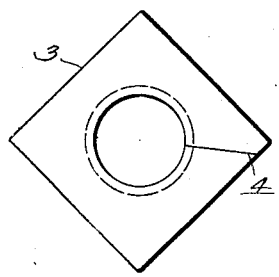
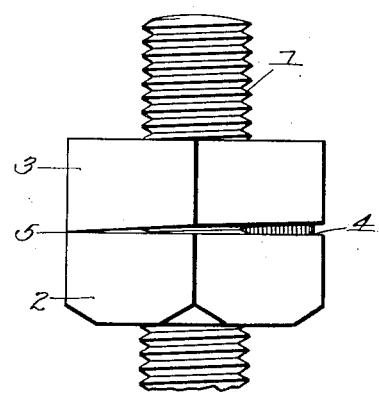
WITNESSES
John R. Schrader
INVENTOR
BY
ATTORNEYS

UNITED STATES PATENT OFFICE.

JOHN R. SCHRADER, OF NEW YORK, N. Y., ASSIGNOR TO DIETER NUT COMPANY, OF NEW YORK, N. Y., A CORPORATION OF NEW YORK.

LOCK-NUT.

1,347,124.     Specification of Letters Patent.     Patented July 20, 1920.

Application filed April 17, 1919. Serial No. 290,768.

*To all whom it may concern:*

Be it known that I, JOHN R. SCHRADER, a citizen of the United States, and residing in the city of New York, borough of Bronx, and State of New York, have invented certain new and useful Improvements in Lock-Nuts, of which the following is a full and clear specification, illustrated in the accompanying drawings.

The particular novel features of my invention are set forth in the annexed claims.

My invention relates to lock nuts of the type which, when screwed hard on their seats, will cause the binding of the thread against the nut in such fashion that the threads, so engaged will be partially distorted, so that the nut is prevented from becoming loose.

In the accompanying drawings, Figures 1, 2 and 4 are side elevations of a bolt on which the lock nut is threaded, Fig. 1 showing the nut disengaged from its seat, Fig. 2 showing the nut just lightly seated and Fig. 4 showing the nut screwed down hard on its seat.

Fig. 3 shows a face view of the nut.

Referring now to Fig. 1, 1 is the bolt on to which a nut 2 is threaded which is to be locked by lock nut 3. The characteristic feature of lock nut 3 is the shape of its face with which it is seated against nut 2. This face is shaped as a helical surface having the same pitch and direction as the thread of the bolt on which it is screwed. The shape can best be seen from Figs. 1 and 3 where the helix starts at 4, which constitutes an edge standing radially and at right angles to the central axis of the bolt. When this radius is rotated one turn around the bolt in the direction of the thread and following the pitch of the thread, it arrives at the starting point, a distance above edge 4 which is equal to the pitch *a* of the thread. Edge 4 is shown in Fig. 3. If the nut is screwed on to the bolt in the direction of the arrow so that it touches nut 2 as shown in Fig. 2, it will be noted that edge 4 throughout its entire length, will seat on nut 2. If the lock nut 3 is screwed tight against nut 2 with considerable force, the thread of the lock nut commencing at edge 4 will be wedged into the thread of bolt 1 where it gradually disappears into nut 2 and thereby the bolt thread will be distorted such that it forms an effective locking means against the loosening of lock nut 3. It is preferred to have edge 4 stand at right angles to the bolt axis, because thereby the tendency of the lock nut to bend the bolt is considerably lessened. If, for instance, the outer point of edge 4 should touch nut 2 first (in case the edge should not stand at right angles to the bolt axis), a considerable leverage would be established which tends to bend the bolt.

When lock nut 3 is screwed down tight, it will seat approximately with one-half of its face, as can be seen from Fig. 4, where lock nut 3 touches lock nut 2 at 5 as well as at the edge 4.

A similar locking effect may be obtained by putting the helical surface of nut 3 opposite to the direction of the bolt thread.

Of course lock nut 3 may be used with the same effect as an independent nut which may be screwed and locked against any flat surface to which the bolt is to be attached.

I claim:—

1. A lock nut of the character described, having its entire face shaped as a helical surface, of the same pitch as the thread.

2. A lock nut of the character described, having its entire face shaped as a helical surface, of the same pitch and direction as the thread.

JOHN R. SCHRADER.